(12) United States Patent
Ortalano et al.

(10) Patent No.: US 6,503,317 B1
(45) Date of Patent: Jan. 7, 2003

(54) DYE BASED AQUEOUS PIGMENT DISPERSIONS

(75) Inventors: Darren Mark Ortalano, Cincinnati, OH (US); Christopher Joseph Vissing, Amelia, OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/700,927

(22) PCT Filed: May 28, 1999

(86) PCT No.: PCT/US99/11935

§ 371 (c)(1),
(2), (4) Date: Nov. 20, 2000

(87) PCT Pub. No.: WO99/61534

PCT Pub. Date: Dec. 2, 1999

(51) Int. Cl.[7] .................. C09D 11/00; C09B 67/22; C09B 67/20

(52) U.S. Cl. .................. 106/493; 106/31.28; 106/410; 106/413; 106/414; 106/453; 106/460; 106/472; 106/476; 106/494; 106/495; 106/496; 106/497; 106/498; 106/499; 106/506; 8/550; 8/618

(58) Field of Search .................. 106/410, 413, 106/414, 472, 476, 493, 494, 495, 496, 497, 498, 499, 453, 460, 31.28, 506; 8/550, 618

(56) References Cited

U.S. PATENT DOCUMENTS

| | | | |
|---|---|---|---|
| 3,477,866 A | 11/1969 | Remer | 106/289 |
| 4,162,348 A | 7/1979 | Juzu et al. | 428/474 |
| 4,468,230 A | 8/1984 | Thomas et al. | 8/528 |
| 4,523,953 A | 6/1985 | Paffoni et al. | 106/23 |
| 4,664,711 A | 5/1987 | Kawaguchi et al. | 106/23 |
| 5,264,032 A | 11/1993 | Dietz et al. | 106/411 |
| 5,344,465 A | 9/1994 | Colberg | 8/639 |
| 5,431,723 A | 7/1995 | Bermes et al. | 106/22 K |
| 5,531,818 A | 7/1996 | Lin et al. | 106/23 C |
| 5,735,941 A | 4/1998 | Feeman et al. | 106/31.28 |
| 5,868,823 A | 2/1999 | Yamazaki et al. | 106/31.58 |
| 5,879,439 A | 3/1999 | Nagai et al. | 106/31.28 |
| 5,885,343 A | 3/1999 | Cernigliaro et al. | 106/482 |
| 5,891,227 A | 4/1999 | Hoffman et al. | 106/31.28 |

FOREIGN PATENT DOCUMENTS

| | | | |
|---|---|---|---|
| EP | 0 259 130 | 3/1988 | |
| EP | 0 517 513 A2 | 12/1992 | C09B/67/22 |
| EP | 538784 * | 4/1993 | |
| EP | 0 710 706 A2 | 5/1996 | C09B/17/00 |
| EP | 0 745 651 A1 | 12/1996 | C09B/11/00 |
| EP | 0 859 036 A1 | 8/1998 | C09D/11/00 |
| GB | 1424517 | 2/1976 | C09B/67/00 |
| JP | 59227951 | 4/1993 | C09B/67/20 |
| JP | 9-151344 | 6/1997 | C09D/11/00 |
| WO | WO 97/35927 | 10/1997 | C09B/67/22 |

OTHER PUBLICATIONS

Bauer W., Cassella AG, Ritter J., Tailoring Dyes for Ink Jet Applications, American Ink Maker, pp. 46–49, Jan. 1995.

Fishman David H., Ink Jet Technology, American Ink Maker, pp. 36–39, Jun. 1997.

Toth Debora, Pigmented Inks for Ink Jet Systems, American Ink Maker, pp. 22–24, 80, Jun. 1997.

* cited by examiner

*Primary Examiner*—Anthony J. Green
(74) *Attorney, Agent, or Firm*—Sidney Persley

(57) ABSTRACT

Aqueous based pigment dispersions wherein the pigment is dispersed in a dispersant dye in the absence of any other dispersant or additive and aqueous based printing ink compositions containing these a pigment dispersions. Methods for preparing aqueous based pigment dispersions, wherein the pigment is dispersed in a dispersant dye, and method for preparing printing ink compositions incorporating these dispersions.

39 Claims, No Drawings

DYE BASED AQUEOUS PIGMENT DISPERSIONS

BACKGROUND OF THE INVENTION

1. Field of the Invention

The present invention is directed to aqueous based pigment dispersions and ink compositions containing same wherein the pigment is dispersed in a dispersant dye in the absence of surfactants or resins.

2. Description of Related Art

Aqueous based pigment dispersions are used in a variety of industrial applications such as the manufacture of printing ink, paint, pulp and paper, coatings, and textiles to provide coloration. Inks and coatings typically contain clear extenders which generally consist of resins and additives which are suitable for the specific application. The resins and additives employed cause the pigment to adhere to the surface of the substrate being colored. Since dispersed pigments typically have fine particle sizes, one only needs to provide minimal agitation to establish coloration. Therefore, the use of dispersed pigments are convenient for color formulators.

The more common employed pigment dispersants include styrene/acrylic copolymers, acrylic polymers, polyvinyl pyrrolidone resins, octylphenol ethoxylates, acetylenics, phosphate esters, and sulfonates. There are other commercially available pigment dispersants some of these are described in the *Directory on Emulsifiers and Detergents*, Volume 1: Emulsifiers and Detergents, MC Publishing Co., Glen Rock, N.J. The choice of dispersant or class of dispersants for an aqueous pigment dispersion will depend on the end-use intended for the aqueous pigment dispersion. The pigment employed is typically hydrophobic and therefore insoluble in water. However, the dispersant may have both hydrophobic and hydrophilic properties. In an aqueous based dispersions, the hydrophobic portion of the dispersant attaches to the pigment while the hydrophilic portion resides in the aqueous phase of the dispersion. The hydrophobic portion (hydrophile) of the dispersant can be anionic, non-ionic or cationic. Anionic or nonionic hydrophiles are more commonly used in the printing, ink, paint, textile and pulp and paper industries. For example, various printing ink applications, especially film printing applications, typically require the use of styrene/acrylic resin pigment dispersants. On the other hand, in textile applications non-ionic surfactant pigment dispersants are used.

The use of styrene/acrylic resins and surfactants presents a number of drawbacks when aqueous pigment dispersions are used, for example, in ink jet printing and pulp and paper applications. When used in pulp and paper applications, such use can lead to foaming which, consequently can cause defects in the paper, e.g. mottling. Foaming itself has a negative effect on pulp and paper production. In thermal cure ink jet applications, the use of resins and surfactants can clog the ink jet printing head as these components sometimes break up to form water-insoluble fragments which adhere to the interior nozzle of the print head. In addition, high surface tensions are normally required for ink jet inks in order to achieve reduced dot gain in the printed product. Due to their nature, however, surfactants tend to lower the surface tension of inks. Color gamut is another key parameter employed to measure inking systems, however, many surfactants, such as lignosulfonates, are darkly colored and therefore can detract from the colorization by the pigment.

As the aforementioned problems clearly illustrate, the use of surfactants and resins introduce a number of drawbacks related to the use of conventional aqueous pigment dispersions in industrial printing applications. Therefore, finding a dispersant that addresses these problems has become an important industry objective. Industrial initiatives presently ongoing are aimed at developing aqueous pigment dispersions for paper and pulp and ink jet printing applications that overcome these drawbacks. In the meantime, the paper and pulp and ink jet printing industries employ dyes or dye based pigments for coloration. Dyes will continue to be heavily used as colorants in these industries until the problems associated with pigmented systems have been resolved.

Improving the lightfastness of printed materials continues to be a primary objective for the large format printing market (i.e. billboards and posters). Likewise, paper mills seek to adopt pigment colorants for the improved lightfastness they offer. Doing so would offer manufacturing advantages such as eliminating the need for filtration systems to remove the excess dye from manufacturing waste streams. Moreover, the lightfastness of dye based materials is limited and improvements in this area have been slow in coming. The pulp and paper industry also uses low-end pigments such as OT Yellow and C.I. Pigment Yellow 14 for various applications. These pigments, however, only offer slightly improved lightfastness properties.

The general specification for pigments suitable for use in industrial applications include the obvious requirements of daylight resistance, alkali, acid, and heat resistance and the wettablity of the pigment by the vehicle selected. Pigments to be dispersed in aqueous vehicles are chosen for their flow characteristics, gloss level and printability. Dispersion stability is also important. Additional physical and economic requirements for the pigment is that it have low oil absorption, high color strength and be economically priced.

Dyes are fundamentally different from pigments as they are normally pure organic or metallo organic complexes which are generally soluble in the medium they color. For instance, water soluble dyes are often used in aqueous based applications. The color or tinting strength of a pigment or dye is a measure of its ability to impart color to a system. Dye color is produced by selective absorption. No discrete particles are present, no scatter occurs and the system is transparent. By contrast, pigment color is primarily related to its chemical composition, particle size and distribution. The actual color strength, in the case of a pigmented printing ink will depend upon film thickness and the concentration of the pigment. Dyes, once dissolved, are generally present as single molecules, while pigments are deaggregated to primary particles or crystals and dispersed into a medium, a process that typically requires high energy to effect suitable coloration. Primary pigment particles are composed of many thousands of molecules packed into a concentrated area having a dimension of 50 to 500 nanometers. These primary particles can be amorphous or crystalline. Dye based inks are widely used on paper for bread wrappers, bags, etc. where no lightfastness requirement is demanded. Because of their almost Newtonian behavior, low viscosity inks of high color strength may be formulated enabling clean printing to be obtained. The migration tendencies of dyes do not encourage their use on plastic films or in contact with a wide range of products. Due perhaps to their differences, the use of dyes and pigments have generally been mutually exclusive to one another. An exception is the use of dyes to form dye based pigment like materials (e.g. laked pigments such as FD&C Red No. 6, C.I. Pigment Red 81 and C.I. Pigment Violet 3). The lightfastness of a dye may be improved, for example, by using a high acid value phenolic type resin in place of, or in combination with, tannic acid, reducing the amount of resin required; a technique known as "laking". Laking can affect the shade or coloration of the dye considerably. The lightfastness of dye based ink formulations is substantially less by comparison than that of pigment based ink formulations.

U.S. Pat. No. 3,477,866 discloses the use dyes to form dye based pigments formed from the salts of acid dyes dispersed in water using conventional surfactants and resins. U.S. Pat. No. 4,162,348 discloses the use of anionic surfactants to disperse a pigment and a dye. The two dispersions are then combined to form a single colorant. U.S. Pat. No. 4,468,230 relates to dispersions of anionic acid dyes having limited solubility using conventional surfactants. U.S. Pat. No. 4,523,953 describes dyes coprecipitated with titanium dioxide or aluminum hydroxide pigments to form pigment complexes. These complexes are then dispersed in water, or some other medium, by conventional dispersants. U.S. Pat. No. 4,664,711 relates to dyes used to provide color for ink pen formulations. No pigments are discussed since generally ink pen formulations do not use pigments. U.S. Pat. No. 5,735,941 teaches using of separate cartridges of an anionic stabilized a pigment based formulation and a dye-based formulation made of a cationic dye. When the two are jetted next to one another the anionic stabilized pigment reduces intercolor bleeding. The patent illustrates the synergistic use of pigments and dyes to solve an important problem in industrial ink jet applications (i.e. intercooler bleeding). European Patent 0 745 651 discloses the use of dye based ink jet formulations and describes the many problems associated with the use of conventional dispersants. Finally, the *American Ink Maker*, June 1997 Edition, features two articles entitled *Ink Jet Technology* (pgs. 36 to 39) and *Pigmented Inks for Ink Jet Systems* (pgs. 23 to 24 and 80) which relate to the separate use of dyes and pigments. The articles represent the widely accepted view held by the skilled artisan that these components should be used individual as colorants. More specifically they teach that aqueous pigment dispersions are to used exclusive of dyes.

It is an object of the present invention to provide aqueous based pigment compositions employing dye as the dispersant which shall be advantageously suitable for overcoming the aforementioned problems associated with conventional aqueous pigment dispersions.

SUMMARY OF THE INVENTION

The invention is aqueous based pigment dispersion wherein the pigment is dispersed in a dispersant dye as identified in the International Colour Index in the absence of any other dispersant or additive.

In another aspect, the invention is aqueous based printing inks containing a pigment dispersion wherein the pigment is dispersed in a dispersant dye as identified in the International Colour Index in the absence of any other dispersant or additive.

In yet another aspect, the invention is a method of preparing aqueous based pigment dispersion and a method for preparing aqueous based printing inks that incorporate pigment dispersions wherein the pigment is dispersed in a dispersant dye as identified in the International Colour Index, in the absence of any other dispersant or additive.

DETAILED DESCRIPTION OF THE INVENTION

The aqueous based pigment dispersions and ink compositions of the present invention do not contain surfactant or resins and thereby avoid the problems associated with the use of these components without any loss in color gamut. In addition, a lower particle size distribution than that achieved using conventional surfactant dispersants is generally produced by the present invention. It has also been suprisingly found that the use of dyes as a pigment dispersant: (a) reduces and/or eliminates nozzle clogging in printing heads; (b) prevents surface tension reduction in formulated printing inks; (c) reduces the tendency for foaming; (d) sustains or increases the color gamut and cleanliness of the color shade obtainable; (e) avoids the negative effect on color caused by the use of surfactants; (f) increases lightfastness over that achievable with dye colorants; and (g) generally reduces the particle size distribution of the dispersed pigment. There are also the advantages for the formulators as they are able to achieve improved lightfastness. In addition, manufacturers are able to reduce dye emissions in manufacturing process waste streams.

The classes of dyes suitable for use in present invention may be selected from acid dyes, natural dyes, direct dyes (either cationic or anionic), basic dyes, and reactive dyes.

The acid dyes, also regarded as anionic dyes, are soluble in water and mainly insoluble in organic solvents and are selected, from yellow acid dyes, orange acid dyes, red acid dyes, violet acid dyes, blue acid dyes, green acid dyes, and black acid dyes. European Patent 0 745 651, incorporated herein by reference, describes a number of acid dyes which are suitable for use in the present inventveon The yellow acid dyes selected include Acid Yellow 1 International Color Index or C.I. 10316); Acid Yellow 7 (C.I. 56295); Acid Yellow 17 (C.I. 18965); Acid Yellow 23 (C.I. 19140); Acid Yellow 29 (C.I. 18900); Acid Yellow 36 (C.I. 13065); Acid Yellow 42 (C.I. 22910); Acid Yellow 73 (C.I. 45350); Acid Yellow 99 (C.I. 13908); Acid Yellow 194; and Food Yellow 3 (C.I. 15985). The orange acid dyes selected include Acid Orange 1 (C.I. 13090/1); Acid Orange 10 (C.I. 16230).; Acid Orange 20 (C.I. 14603); Acid Orange 76 (C.I. 18870); Acid Orange 142; Food Orange 2 (C.I. 15980); and Orange B. The red acid dyes selected include Acid Red 1. (C.I. 18050); Acid Red 4 (C.I. 14710); Acid Red 18 (C.I. 16255), Acid Red 26 (C.I. 16150); Acid Red 2.7 (C.I. as Acid Red 51 (C.I. 45430, available from BASF Corporation, Mt. Olive, N.J.) Acid Red 52 (C.I. 45100); Acid Red 73 (C.I. 27290); Acid Red 87 (C.I. 45380); Acid Red 94 (C.I. 45440) Acid Red 194;. and Food Red 1 (C.I. 14700). The violet acid dyes selected include Acid Violet 7 (C.I. 18055); and Acid Violet 49 (C.I. 42640). The blue acid dyes selected include Acid Blue 1 (C.I. 42045); Acid Blue 9 (C.I. 42090); Acid Blue 22 (C.I. 42755); Acid Blue 74 (C.I. 73015); Acid Blue 93 (C.I. 42780); and Acid Blue 158A (C.I. 15050). The green acid dyes selected include Acid Green 1 (C.I. 10028); Acid Green 3 (C.I. 42085); Acid Green 5 (C.I. 42095); Acid Green 26 (C.I. 44025); and Food Green 3 (C.I. 42053). The black acid dyes selected include Acid Black 1 (C.I. 20470); Acid Black 194 (BASANTOL™ X80, available from BASF Corporation, an azo/1:2 CR-complex.

The direct dyes selected for use in the present invention include Direct Blue 86 (C.I. 74180); Direct Blue 199; Direct Black 168; Direct Red 253; and Direct Yellow 107/132 (C.I. Not Assigned). The direct dyes are commonly used in coloration of pulp paper.

The natural dyes selected for use in the present invention include Alkanet (C.I. 75520,75530); Annafto (C.I. 75120); Carotene (C.I. 75130); Chestnut; Cochineal (C.I. 75470); Cutch (C.I. 75250, 75260); Divi-Divi; Fustic (C.I. 75240); Hypernic (C.I. 75280); Logwood (C.I. 75200); Osage Orange (C.I. 75660); Paprika; Quercitron (C.I. 75720); Sanrou (C.I. 75100); Sandal Wood (C.I. 75510, 75540, 75550, 75560); Sumac; and Tumeric (C.I. 75300).

The reactive dyes selected for use in the present invention include Reactive Yellow 37 (monoazo dye); Reactive Black 31 (disazo dye); Reactive Blue 77 (phthalo cyanine dye) and Reactive Red 180 and Reactive Red 108 dyes.

Preference is given to the use of acid dyes such as Acid Black 194, Acid Red 51, Acid Blue 9, Acid Green 26, Acid Yellow 36, Acid Orange 142, Direct Blue 86, Direct Red 253 and Direct Yellow 107/132 dyes. The aqueous based pigment compositions of invention comprise about 1 wt. % to about 50 wt. % dye, based on the total weight of the composition, and preferably comprise about 3 wt. % to about 25 wt. % dye.

Pigments suitable for use in the present invention include International Colour Index or C.I. Pigment Black 1, C.I Pigment Black 31, C.I. Pigment Black 11, C.I. Pigment Black 7, C.I. Pigment Blue 61, C.I. Pigment Blue 62, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 29, C.I. Pigment Blue 27, C.I. Pigment Green 17, C.I. Pigment Green 18, C.I. Pigment Green 7, C.I. Pigment Green 36, C.I. Pigment Orange 5, C.I. Pigment Orange 13, C.I. Pigment Orange 16, C.I. Pigment Orange 34, C.I. Pigment Orange 36, C.I. Pigment Violet 3, C.I. Pigment Violet 27, C.I. Pigment Violet 23, C.I. Pigment Violet 19, C.I. Pigment Red 122, C.I. Pigment Red 202, C.I. Pigment Red 206, C.I. Pigment Red 207, C.I. Pigment Red 22, C.I. Pigment Red 23, C.I. Pigment Red 17, C,I. Pigment Red 210, C.I. Pigment Red 170, C.I. Pigmnent Red 188, C.I. Pigment Red 185, C.I. Pigment Red 146, C.I. Pigment Red 144, C.I. Pigment Red 101, C.I. Pigment Red 176, C.I. Pigment Red 48:1, C.I. Pigment Red 48:2, C.I. Pigment Red 57:1, C.I. Pigment Red 81:1, C.I. Pigment Red 81:2, C.I. Pigment Red 81:3, C.I. Pigment Red 81:5, C.I. Pigment Red 179, C.I. Pigment Red 3, C.I. Pigment Red 249, C.I. Pigment Red 114, C.I. Pigment Red 181, C.I. Pigment Yellow 1, C.I. Pigment Yellow 2, C.I. Pigment Yellow 3, C.I. Pigment Yellow 147, C.I. Pigment Yellow 142, C.I. Pigment Yellow 42, C.I. Pigment Yellow 151, C.I. Pigment Yellow 154, C.I. Pigment Yellow 180, C.I. Pigment Yellow 138, C.I. Pigment Yellow 139, C.I. Pigment Yellow 93, C.I. Pigment Yellow 109, C.I. Pigment Yellow 110, C.I. Pigment Yellow 14, C.I. Pigment Yellow 12, C.I. Pigment Yellow 17, C.I. Pigment Yellow 13, C.I. Pigment Yellow 74, C.I. Pigment Yellow 73, C.I. Pigment Yellow 75, C.I. Pigment Yellow 83, C.I. Pigment Yellow 65, C.I. Pigments Yellow 128, D&C Red No. 7, D&C Red No. 6 and D&C Red No. 34. Preferably, the pigment employed in the present invention is a carbon black pigment such as Regal 330 (available from Cabot Corporation); quinacridone pigment such as Quinacridone Magenta (228-0122) (available from Sun Chemical Corporation, Fort Lee, N.J.); diarylide yellow pigment such as AAOT Yellow (274-1788) (available from Sun Chemical Corporation); and phthalocyanine blue pigment such as Blue 15:3 (294-1298) (available from Sun Chemical Corporation). The aqueous based pigment compositions of invention comprise about 1 wt. % to about 50 wt. % pigment, based on the total weight of the composition, and preferably comprise about 5 wt. % to about 50 wt. % pigment.

The water used in the present invention is pure or ultra-pure water such as ionexchange water or water purified by ultrafiltration, reverse osmosis or distillation. Water sterilized by ultraviolet irradiation or by the addition of hydrogen peroxide, or the like, is preferred as it can prevent mold and bacteria growth during storage of the pigment dispersion over long periods of time. The amount of water added to the composition makes up the weight balance of the composition.

Additives may be used in combination with the dye dispersant and pigment of the present invention. For instance, ammonia or some other suitably finctional amine may be used to adjust the pH of the dispersion. Biocides, such as Proxel GMX (available from Rohm & Haas, Philadelphia, Pa.) can be used to aid in the inhibition of bacterial growth. Glycols may be used to modify the properties of the dispersion and improve jettability and would preferably include propylene glycol, polyethylene glycol (such as PEG 200) 400 and 1000, available from Union Carbide, Danbury, Conn.). Defoamers, co-solvents and surface active agents, such as octylphenolethoxylates or acetylenics, may be used to modify surface tension. However, additives are used the amount of additive should be held to a minimum. For example, a glycol should represent no more than 20 wt. % of the composition; a biocide no more than 0.5 wt. %; a defoamer no more than 1.5 wt. %; and a co-solvent no more than 30 wt. %.

In addition, emphasis is given to the fact that the individual pigment and dye components of the dispersions and ink compositions of the present invention may be combined as desired and may be selected from those having the same or different color space.

In order to illustrate the effectiveness of the aqueous based pigment compositions of the present invention, conventional aqueous based pigment compositions containing surfactants, such as a phosphate ester surfactant (available from Rhone Poulenc, Cranbury, N.J.); Maracarb N-1 (available from Lignotech, Greenwich, Conn.); and PEG-400 a polyethylene glycol (available from Union Carbide, Corporation), along with resins were prepared for comparison.

The following examples illustrate specific aspects of the present invention and are not intended to limit the scope thereof in any respect and should not be so construed. The temperatures are in degrees centigrade and the percentages are by weight unless otherwise indicated.

EXAMPLE 1

C.I. Pigment Blue 15:3 (20 wt. %, Green/Shade Phthalocyanine Blue) was dispersed into distilled water (70 wt. %) with Acid Blue 9 dye (10 wt. %, Triphenylmethane Blue dye, Basacid™, NB-755 available from BASF Corporation) for 18 minutes on an Eiger™ mill.

EXAMPLE 2

C.I. Pigment Blue 15:3 (24 wt. %, Green/Shade Phthalocyanine Blue, 249-1282 available from Sun Chemical) was dispersed into distilled water (70 wt. %) with Direct Blue 86 dye (6 wt. %, Phthalocyanine dye, SANDOVOC-L™ Turquoise GL Liquid 041, available form Clariant Corporation, Leeds, U.K.) for 18 minutes on an Eiger™ mill.

EXAMPLE 3

C.I. Pigment Blue 15:3 (24 wt. %, Green/Shade Phthalocyanine Blue, 249-1290 available from Sun Chemical) was dispersed into distilled water (68 wt. %) with Direct Blue 86 dye (8 wt. %, Phthalocyanine dye, SANDOVOC-L™ Turquoise GL Liquid 041, available from Clariant Corporation) for 18 minutes on an Eiger™ mill.

EXAMPLE 4

C.I. Pigment Blue 15:3 (20 wt. %, Green/Shade Phthalocyanine Blue, 249-1298, available from Sun Chemical) was dispersed into distilled water (70 wt. %) with Direct Blue 199 dye (10 wt. %, Phthalocyanine dye, SANDOVOC-L™ Br. Blue GNS Liquid, available from Clariant Corporation) for 18 minutes on an Eiger™ mill.

EXAMPLE 5

C.I. Pigment Blue 15:3 (20 wt. %, Green/Shade Phthalocyanine Blue, 249-1298, Sun Chemical) was dispersed into distilled water (70 wt. %) with Direct Blue 199 dye (10 wt. %, Phthalocyanine dye, SANDOVOC-L™ Br. Blue GNS Liquid, available from Clariant Corporation) for 25 minutes on an Eiger™ mill.

EXAMPLE 6

C.I. Pigment Blue 15:3 (14 wt. %, Green/Shade Phthalocyanine Blue, 249-1290 available from Sun Chemical) was dispersed into distilled water (72 wt. %) with Direct Blue 199 dye (14 wt. %, Phthalocyanine dye, SANDOVOC-L™ Br. Blue GNS Liquid, available from Clariant Corporation) for 30 minutes on an Eiger™ mill.

EXAMPLE 7

C.I. Pigment Blue 15:3 (20 wt. %, Green/Shade Phthalocyanine Blue, 249-1290, available from Sun Chemical) was dispersed into distilled water (60 wt. %) with Direct Blue 199 dye (10% Phthalocyanine dye, SANDOVOC-L™ Br. Blue GNS Liquid, available from Clariant Corporation) and polyethylene glycol (10 wt. %, PEG-400) for 18 minutes on an Eiger™ mill.

EXAMPLE 8

COMPARATIVE

C.I. Pigment Blue 15:3 (35 wt. %, Green/Shade Phthalocyanine Blue, 249-1298 available from Sun Chemical) was dispersed into water (56 wt. %) with an ammonia solubilized styrene/acrylic copolymer (9 wt. %, Joncryl™ 67, available from S. C. Johnson Polymer Corp., Racine, Wis.) on an Eiger™ mill for 18 minutes.

EXAMPLE 9

C.I. Pigment Green 7 (20 wt. %, Blue/Shade Phthalocyanine Green, 264-8735 available from Sun Chemical) was dispersed into distilled water (70 wt. %) with Acid Green 26 dye (10 wt. %, Phthalocyanine dye, Basantol™ Green 910, available from BASF Corporation) for 18 minutes on an Eiger™ mill.

EXAMPLE 10

COMPARATIVE

C.I. Pigment Green 7 (35 wt. %, Blue/Shade Phthalocyanine Green, 264-8735 available from Sun Chemical) was dispersed into water (56 wt. %) with an ammonia solubilized styrene/acrylic copolymer (9 wt. %, Joncryl™ 67, available from S. C. Johnson Polymer) for 18 minutes on an Eiger™ mill.

EXAMPLE 11

C.I. Pigment Orange 5 (32 wt. %, DNA Orange, 276-0003 available from Sun Chem,ical) was dispersed into water (52 wt. %) with Acid Orange 142 dye (16 wt. %, Azo/1 :2 Cr Orange dye, Basantol™ Orange 270, available from BASF Corporation) for 60 minutes on an Eiger™ mill.

EXAMPLE 12

COMPARATIVE

C.I. Pigment Orange 5 (35 wt. %, DNA Orange, 264-0003 available from Sun Chemical) was dispersed into water (54 wt. %) with an ammonia solubilized styrene/acrylic copolymer (9 wt. %, Joncryl™ 67, available from S. C. Johnson Polymer) for 18 minutes on an Eiger™ mill.

EXAMPLE 13

C.I. Pigment Red 122 (26 wt. %, Quinacridone Magenta, 228-0122 available from Sun Chemical) was dispersed into distilled water (61 wt. %) with Acid Red 51 dye (13 wt. %, Xanthene dye, Basovit™ Red 425E, available from BASF Corporation) for 24 minutes on an Eiger™ mill.

EXAMPLE 14

C.I. Pigment Red 122 (26 wt. %, Quinacridone Magenta, 228-0122, available from Sun Chemical) was dispersed into distilled water (61 wt. %) with Acid Red 52 dye (13 wt. %, Xanthene dye, Duasyn™ Acid Red B-SF, available from Clariant Corporation) for 24 minutes on an Eiger™ mill.

EXAMPLE 15

C.I. Pigment Red 122 (24 wt. %, Quinacridone Magenta, 228-0122, available from Sun Chemical) was dispersed into distilled water (60 wt. %) with Acid Red 52 dye (16 wt. %, Xanthene dye, Duasyn™ Acid Red B-SF, available from Clariant Corporation) for 24 minutes on an Eiger™ mill.

EXAMPLE 16

C.I Pigment Red 122 (20 wt. %, Quinacridone Magenta, 228-0122 available from Sun Chemical) was dispersed into distilled water (60 wt. %) with Acid Red 52 dye (10 wt. %, Xanthene dye, Duasyn™ Acid Red B-SF, available from Clariant Corporation) for 24 minutes on an Eiger™ mill.

EXAMPLE 17

C.I. Pigment Red 122 (20 wt. %, Quinacridone Magenta, 228-0122 available from Sun Chemical) was dispersed into distilled water (70 wt. %) with Reactive Red 180 dye (10 wt. %, Monoazo dye, Duasyn™ Brilliant Red F3 B-SF, available from Clariant Corporation) for 18 minutes on an Eiger™ mill.

EXAMPLE 18

C.I. Pigment Red 81 (24 wt. %, Yellow/Shade Rhodamine, SMA Salt 228-9862 available from Sun Chemical) was dispersed into distilled water (70 wt. %) with Direct Red 253 dye (6 wt. %, Direct dye, SANDOVOC-L™ Red 3 BF Liquid, available from Clariant Corporation) for 18 minutes on an Eiger™ mill.

EXAMPLE 19

COMPARATIVE

C.I. Pigment Red 122 (36 wt. %, Quinacridone Magenta, 228-0122 available from Sun Chemical) was dispersed into water (57 wt. %) with an anionic phoshphate ester surfactant (7 wt. %, Phosphac 5534, available from Mfg. Chemical) for 18 minutes on an Eiger™ mill.

EXAMPLE 20

C.I. Pigment Yellow 14 (20 wt. %, AAOT Diarylide Yellow, 274-1744 available from Sun Chemical) was dispersed into distilled water (70 wt. %) with Acid Yellow 194 dye (10 wt. %, Acid Yellow dye, Basantol™ Yellow 210, available from BASF Corporation) for 36 minutes on an Eiger™ mill.

EXAMPLE 21

C.I. Pigment Yellow 14 (32 wt. %, AAOT Diarylide Yellow, 274-1788-available from Sun Chemical) was dispersed into distilled water (52 wt. %) with Acid Yellow 36 (16 wt. %, Acid Yellow dye, Basacid™ Yellow 234 available from BASF Corporation) for 18 minutes on an Eiger™ mill.

EXAMPLE 22

C.I. Pigment Yellow 14 (26 wt. %, AAOT Diarylide Yellow, 274-1744 available from Sun Chemical) was dispersed into water (68 wt. %) with Direct Yellow 107/132 dye (6, wt. %, Direct Yellow dye, SANDOVOC-L™ Yellow 3 GF, available from Clariant Corporation) on an Eiger™ mill for 18 minutes.

EXAMPLE 23

COMPARATIVE

C.I. Pigment Yellow 14 (35 wt. %, AAOT Diarylide Yellow, 274-1744 available from Sun Chemical) was dispersed into water (56 wt. %) with ammonia solubilized styrene/acrylic copolymer (9 wt. %, Joncryl™ 67, available from S. C. Johnson Polymer) on an Eiger™ mill for 18 minutes.

EXAMPLE 24

C.I. Pigment Black 7 (26 wt. %, Carbon Black, Regal™ 330, available from Cabot Corporation) was dispersed into distilled water (61 wt. %) with Acid Black 194 dye (13 wt. %, Azo/1:2 Cr dye, Basantol™ X80, available from BASF Corporation) for 24 minutes on an Eiger™ mill.

EXAMPLE 25

C.I. Pigment Black 7 (14 wt. %, Carbon Black, Regal™ 330, available from Cabot Corporation) was dispersed into distilled water (79 wt. %) with Direct Black 168 dye (7 wt. %, Polyazo Black dye, Duasyn™ Direct Black HEF-SF liquid, available from Clariant Corporation) for 18 minutes on an Eiger™ mill.

EXAMPLE 26

C.I. Pigment Black 7 (20 wt. %, Carbon Black, Regal™ 330, available from Cabot Corporation) was dispersed into distilled water (70 wt. %) with Reactive Black 31 dye (10. wt. %, Disazo, Copper Complex, Duasyn™ KRL-SF, available from Clariant Corporation) for 18 minutes on an Eiger™ mill.

EXAMPLE 27

C.I. Pigment Black 7 (20 wt. %, Carbon Black, Raven™ 5000 Ultra, available from Columbian Carbon) was dispersed into distilled water (70 wt. %) with Reactive Black 31 dye (10 wt. %, Disazo, Copper Complex, Duasyn™ KRL-SF, available from Clariant Corporation) for 18 minutes on an Eiger™ mill.

EXAMPLE 28

C.I. Pigment Black 7 (20 wt. %, Carbon Black, Regal™ 350R, available from Cabot Corporation) was dispersed into distilled water (70 wt. %) with Reactive Black 31 dye (10 wt. %, Disazo, Copper Complex, Duasyn™ KRL-SF, available from Clariant Corporation) for 18 minutes on an Eiger™ mill.

EXAMPLE 29

COMPARATIVE

C.I. Pigment Black 7 (22 wt. %, Carbon Black, Regal™ 330, available from Cabot Corporation) was dispersed into distilled water (62 wt. %) with a surfactant (7 wt. %, Rhodafac™ BP-769 surfactant, available from Rhone Poulenc), a second surfactant Maracarb™ N-1 (4 wt. %, available from Lignotech) and polyethylene glycol (5 wt. %, PEG400) on an Eiger™ mill for 18 minutes.

The milling of the pigment to produce the pigment dispersions of this invention in each case was performed on an Eiger™ mill (Eiger is a trademark of Eiger Machinery Corporation, Chicago, Ill.) having glass milling media of 1 mm in diameter. Each pigment was milled from 6 to 60 minutes at a temperature preferably ranging from 70 to 90° F. Particle size measurements were carried out using a Microtrac™ UPA 150 (available from the Honeywell Corporation, Clearwater, Fla.). The particles sizes of these inks were measured at the initial time of blending and after two and later six weeks of oven aging at 120 degrees F. Select black dispersions were formulated into prototypic ink jet systems at 5 % total dye and pigment color level and the remainder clear. The clear was distilled water or a 50/50 blend of distilled water and propylene glycol/PEG-400.

Color strength was measured either by reduction with a standard white pigment in a suitable medium or by measuring the pigmentation level required to give a standard-depth print at a specified film thickness. The surface tension was measured with water, having a surface tension value of 72 dynes, as a reference. Color strength was measured tintorially (either visually or quantitatively with a color computer). Example 13 (dye/pigment) was compared to Example 19 (pigment only) in a tint for shade and color strength. At equal colorant levels, Example 13 was much cleaner to Example 19, and measured 270% strong spectrally to Example 13.

Finally, the jettability of the pigment dispersion was evaluated using an HP-670C thermal ink jet printer (available from Hewlett Packard Corporation, Palo Alto, Calif.). Jettability was demonstrated with Example 24. A typical ink jet ink was made containing distilled water and humectant, along with the dispersion of Example 24. The prototypic ink was jetted using a Hewlett-Packard DeskjetTm 670C printer with a HP51629A cartridge. The ink jetted well with no clogging of the nozzles. Excellent optical density of the black was demonstrated.

Pulp paper handsheets were made by using paper making equipment and by adding standard fixatives, sizing additive and retention aids; additives that are commonly used in paper coloration using both pigments and direct dyes. Handsheets were made by using blue (Example 2) and by using yellow (Example 22) dispersion colorants. Excellent coloration was found with very little color found in the wastewater.

Lightfastness depends upon the properties of the pigment and the dye, but should be intermediate between the pigment and the dye for the combined colorant. In the case of a dye with very good lightfastness, such as Acid Black 194; and a pigment with outstanding lightfastness, such as Carbon Black it is found that the optical density change does not decrease (as a function of time) upon exposure in a Xenon Fadeometer.

Tables I to VI provide the results of the analysis of the above physical properties for the pigment dispersions prepared in Examples 1 to 29. All particle size data is reported in nanometers, and tabulated as mean volume (mv), and the percentage of particles having a particle size below a certain minimum (10%) and maximum (90%) size. In Table I it is noted that 90% of the particles were less than 800 nanometers in size. The particle sizes of the resulting dispersions are generally similar to those of conventional pigment dispersions. However, in some cases, even smaller particle sizes were achieved. Table II provides the data for the particle sizes of various carbon blacks dispersed with dyes. As indicated, very small particle sizes are obtained. Table IIII provides data for Example 26 and comparative Example 29. Table IV below provides optical density data on some prototype ink compositions made with the pigment dispersions from Examples 25, 26 and 29 from above. The ink compositions were made with 5% total (dye and pigment) color by weight and the remainder of a 50/50 blend of distilled water and propylene glycol. The inks were then applied with a #3 Mayer rod on typical copier or ink jet grade paper. Optical density was measured with a densitometer (Byk Gardner). In Table VI optical density data for an ink display made from the dispersion of Example 24 is presented.

TABLE I

Colored Dyes and Colored Pigments

| | | Particle Size (nm) | | |
|---|---|---|---|---|
| Pigment | Example | MEAN (mv) | MIN (10%) | MAX (90%) |
| Blue 15:3 | 1 | 199.6 | 69.9 | 348.5 |
| Blue 15:3 | 2 | 203.0 | 98.7 | 334.6 |
| Blue 15:3 | 3 | 213.2 | 89.4 | 402.0 |
| Blue 15:3 | 4 | 295.6 | 144.9 | 475.2 |
| Blue 15:3 | 5 | 242.8 | 136.0 | 322.5 |
| Blue 15:3 | 6 | 358.1 | 192.6 | 587.3 |
| Blue 15:3 | 7 | 326.0 | 157.8 | 567.1 |
| Blue 15:3 | 8 (Comparative) | 245.5 | 71.6 | 404.5 |
| Green 7 | 9 | 455.5 | 186.0 | 766.8 |
| Green 7 | 10 (Comparative) | 308.2 | 144.6 | 525.9 |
| Orange 5 | 11 | 443.0 | 152.4 | 549.9 |
| Orange 5 | 12 (Comparative) | 446.8 | 194.9 | 792.4 |
| Red 122 | 13 | 172.6 | 73.0 | 265.7 |
| Red 122 | 14 | 473.0 | 130.2 | 785.4 |
| Red 122 | 15 | 214.9 | 11O.8 | 349.3 |
| Red 122 | 16 | 245.5 | 154.6 | 348.6 |
| Red 122 | 17 | 362.2 | 180.1 | 576.2 |
| Red 81 | 18 | 173.0 | 66.7 | 306.4 |
| Red 122 | 19 (Comparative) | 138.7 | 49.7 | 246.0 |
| Yellow 14 | 20 | 120.6 | 52.1 | 206.7 |
| Yellow 14 | 21 | 258.8 | 82.9 | 443.1 |
| Yellow 14 | 22 | 415.5 | 136.5 | 481.4 |
| Yellow 14 | 23 (Comparative) | 261.7 | 128.7 | 351.5 |

TABLE II

Carbon Black Dispersions

| | | Particle Size (nm) | | |
|---|---|---|---|---|
| Pigment | Example | MEAN (mv) | MIN (10%) | MAX (90%) |
| Regal 330 | 24 | 98.7 | 45.0 | 161.4 |
| Regal 330 | 25 | 111.4 | 54.0 | 179.1 |
| Regal 330 | 26 | 108.5 | 60.8 | 159.1 |
| Raven 5000 Ultra | 27 | 84.0 | 29.5 | 187.4 |
| Regal 350R | 28 | 183.0 | 116.5 | 262.1 |

TABLE II-continued

Carbon Black Dispersions

| | | Particle Size (nm) | | |
|---|---|---|---|---|
| Pigment | Example | MEAN (mv) | MIN (10%) | MAX (90%) |
| Regal 330 | 29 (Comparative) | 158.5 | 95.6 | 228.3 |

TABLE III

Carbon Black/Black Dye Dispersions

| | | Particle Size Data | | |
|---|---|---|---|---|
| Example | Ink System | Initial | 2 Weeks | 6 Weeks |
| 26 | water | 108.5 | 108.9 | 108.6 |
| 26 | water/prop. glycol(1/1) | 117.0 | 133.8 | 134.6 |
| 26 | water/PEG-400(1/1) | 98.7 | 164.3 | 209.1 |
| 29 (Comparative) | water | 158.5 | 142.5 | 139.3 |
| 29 (Comparative) | water/prop. glycol(1/1) | 153.4 | 137.7 | 134.6 |
| 29 (Comparative) | water/PEG-400(1/1) | 154.4 | 155.5 | 449.9 |

TABLE IV

Optical Density of Select Black Prototype Inks

| Example | Optical Density |
|---|---|
| 25 | 1.21 |
| 26 | 1.31 |
| 29 (Comparative) | 0.90 |

TABLE V

Surface Tension (dynes/cm)

| Color | Example | Surface Tension |
|---|---|---|
| Yellow | 22 | 57.7 |
| Yellow | 23 (Comparative) | 40.0 |
| Blue | 4 | 62.4 |
| Blue | 8 (Comparative) | 42.5 |

TABLE VI

| Time in Fadeometer (hours) | Optical Density |
|---|---|
| 0-Initial | 2.16 |
| 24 | 2.14 |
| 48 | 2.15 |
| 72 | 2.17 |
| 162 | 2.13 |

The pigment dispersions prepared in accordance with the teachings of the present invention indicate excellent quality of dispersion as quantified by: particle size, particle size stability, high color value and high optical density, excellent dispersion and ink stability. Higher surface tension is found with dispersing with dye than with conventional resins or surfactants. Improved lightfastness over dyes is observed. Additionally, the compositions of the present invention have the ability to jet in an ink jet print head (when made into a prototypical ink jet ink) and have the ability to color paper efficiently without much loss of color due to effluent waste.

Those skilled in the art having the benefit of the teachings of the present invention as hereinabove set forth, can effect numerous modifications thereto. These modifications are to be construed as being encompassed within the scope of the present invention as set forth in the appended claims.

We claim:

1. An aqueous based pigment dispersion comprising a pigment, dispersant dye identified in the International Colour Index, and water; wherein the pigment is dispersed by the dye.

2. The pigment dispersion of claim 1 wherein the pigment is selected from the group consisting of carbon black pigments; phthalocyanine blue pigments; phthalocyanine green pigments; diarylide yellow pigments; azo orange pigments; mnonoarylide yellow pigments; napthol red pigments; rhodamine red pigments; precipitated azo pigments; benzimidazolone pigments; heterocyclic yellow pigments; carbazole violet pigments; oxide pigments; and quinacridone pigments.

3. The pigment dispersion of claim 2 wherein the pigment is a carbon black pigment selected from the group consisting of various grades of C.I. Pigment Black 7.

4. The pigment dispersion of claim 2 wherein the pigment is a phthalocyariine blue pigment selected from the group consisting of C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, and C.I. Pigment Blue 16.

5. The pigment dispersion of claim 2 wherein the pigment is a phthalocyanine green pigment selected from the group consisting of C.I. Pigment Green 7, and C.I. Pigment Green 36.

6. bhe pigment dispersion of claim 2 wherein the pigment is a diarylide yellow pigment selected from the group consisting of C.I. Pigment Yellow 14, C.I. Pigment Yellow 12, C.I. Pigment Yellow 17, C.I. Pigment Yellow 13, and C.I. Pigment Yellow 83.

7. The pigment dispersion of claim 2 wherein the pigment is an azo orange pigment selected from the group consisting of C.I. Pigment Orange 5, C.I. Pigment Orange 13, C.I. Pigment Orange 16, C.I. Pigment Orange 34, and C.I. Pigment Orange 36.

8. The pigment dispersion of claim 2 wherein the pigment is a monoarylide yellow pigment selected from the group consisting of Pigment Yellow 1, C.I. Pigment Yellow 3, C.I. Pigment Yellow 74, C.I. Pigment Yellow 73, C.I. Pigment Yellow 75, and C.I. Pigment Yellow 65.

9. The pigment dispersion of claim 2 wherein the pigment is a napthol red pigment selected from the group consisting of C.I. Pigment Red 22, C.I. Pigment Red 23, C.I. Pigment Red 17, C.I. Pigment Red 210, C.I. Pigment Red 170, C.I. Pigment Red 188, C.I. Pigment Red 185, C.I. Pigment Red 146, C.I. Pigment Red 144, and C.I. Pigment Red 176.

10. The pigment dispersion of claim 2 wherein the pigment is a rhodamine red pigment selected from the group consisting of C.I. Pigment Red 81:1, C.I. Pigment Red 81:2, C.I. Pigment Red 81:3, and C.I. Pigment Red 81:5.

11. The pigment dispersion of claim 2 wherein the pigment is a precipitated azo pigment selected from the group consisting of C.I. Pigment Red 48:1, C.I. Pigment Red 48:2, C.I. Pigment Red 48:3, C.I. Pigment Red 49:1, C.I. Pigment Red 49:2, and C.I. Pigment Red 57:1.

12. The pigment dispersion of claim 2 wherein the pigment is a benzimidazolone pigment selected from the group consisting of C.I. Pigment Yellow 151, C.I. Pigment Yellow 154, and C.I. Pigment Yellow 180.

13. The pigment dispersion of claim 2 wherein the pigment is a heterocyclic yellow pigment selected from the group consisting of C.I. Pigment Yellow 138, C.I. Pigment Yellow 139, C.I. Pigment Yellow 93, C.I. Pigment Yellow 109; C.I. Pigment Yellow 10 and C.I. Pigment Yellow 128.

14. The pigment dispersion of claim 2 wherein the pigment is the carbazole violet pigment C.I. Pigment Violet 23.

15. The pigment dispersion of claim 2 wherein the pigment is an oxide pigment selected from the group consisting of C.I. Pigment Black 11, C.I. Pigment Blue 29, C.I. Pigment Blue 27, C.I. Pigment Green 17, C.I. Pigment Green 18, C.I. Pigment Red 101, and C.I. Pigment Yellow 42.

16. The pigment dispersion of claim 2 wherein the pigment is a quinacridone pigment selected from the group consisting of C.I. Pigment Violet 19, C.I. Pigment Red 122, C.I. Pigment Red 202, C.I. Pigment Red 206, and C.I. Pigment Red 207.

17. The pigment dispersion of claim 1 wherein the dispersant dye is selected from the group consisting of acid dyes, natural dye, direct dyes, basic dyes and reactive dyes.

18. The pigment dispersion of claim 17 wherein the dispersant dye is an acid dye.

19. The pigment dispersion of claim 18 wherein the acid dye is selected from the group consisting of a yellow acid dye, an orange acid dye, a red acid dye, a violet acid dye, a blue acid dye, a green acid dyes, and a black acid dye.

20. The pigment dispersion of claim 19 wherein the yellow acid dye is selected from the group consisting of Acid Yellow 1 (C.I. 10316); Acid Yellow 7 (C.I. 56205); Acid Yellow 17 (C.I. 18965); Acid Yellow 23 (C.I. 19140); Acid Yellow 29 (C.I. 18900); Acid Yellow 36 (C.I. 13065); Acid Yellow 42 (C.I. 22910); Acid Yellow 73 (C.I. 45350); Acid Yellow 99 (C.I. 13908); Acid Yellow 194; and Food Yellow 3 (C.I. 15985).

21. The pigment dispersion of claim 19 wherein the orange acid dye is selected from the group consisting of Acid Orange 1 (C.I. 13090/1); Acid Orange 10 (C.I. 16230); Acid Orange 20 (C.I. 14603); Acid Orange 76 (C.I. 18870); Acid Orange 142; Food Orange 2 (C.I. 15980); and Orange B.

22. The pigment dispersion of claim 19 wherein the red acid dye is selected from the group consisting of Acid Red 1 (C.I. 18050); Acid Red 4 (C.I. 14710); Acid Red 18 (C.I. 16255); Acid Red 26 (C.I. 16150); Acid Red 27 (C.I. 16185); Acid Red 51 (C.I. 45430); Acid Red 52 (C.I. 45100); Acid Red 73 (C.I. 27290); Acid Red 87(C.I. 445380); Acid Red 94 (C.I. 45440); Acid Red 194; and Food Red 1 (C.I. 14700).

23. The pigment dispersion of claim 19 wherein the violet acid dye is selected from the group consisting of Acid Violet 7 (C.I. 18055); and Acid Violet 49 (C.I. 42640).

24. The pigment dispersion of claim 19 wherein the blue acid dye is selected from the group consisting of include Acid Blue 1 (C.I. 42045); Acid Blue 9 (C.I. 42090); Acid Blue 22 (C.I. 42755); Acid Blue 74 (C.I. 73015); Acid Blue 93 (C.I. 42780); and Acid Blue 158A (C.I. 15050).

25. The pigment dispersion of claim 19 wherein the green acid dye is selected from the group consisting of Acid Green 1 (C.I. 10028); Acid Green 3 (C.I. 42085); Acid Green 5 (C.I. 42095); Acid Green 26 (C.I. 44025); and Food Green 3 (C.I. 42053).

26. The pigment dispersion of claim 19 wherein the black acid dye is selected from the group consisting of Acid Black 1 (C.I. 20470) and Acid Black 194.

27. The pigment dispersion of claim 17 wherein the dispersant dye is a direct dye.

28. The pigment dispersion of claim 27 wherein the direct dye is an anionic direct dye.

29. The pigment dispersion of claim 27 wherein the direct dye is a cationic direct dye.

30. The pigment dispersion of claim 27 wherein the direct dye is selected from the group consisting of Direct Blue 86 (C.I. 74180), Direct Red 199, Direct Black 168, Direct Red 253 and Direct Yellow 107/132.

31. The pigment dispersion of claim 17 wherein the dispersant dye is a reactive dye.

32. The pigment dispersion of claim 17 wherein the reactive dye is selected from the group consisting of Reactive Yellow 37; Reactive Black 31; Reactive Blue 77, Reactive Red 180 and Reactive Red 108.

33. The pigment dispersion of claim 1 containing about 1 wt. % to about 50 wt. % dye, based on the weight of the dispersion.

34. The pigment dispersion of claim 33 wherein the dispersant dye is about 3 wt. % to about 25 wt. %.

35. The pigment dispersion of claim 1 containing about 1 wt. % to about 50 wt. % pigment, based on the weight of the dispersion.

36. The pigment dispersion of claim 35 wherein the pigment is present in about 5 wt. % to about 50 wt. %.

37. A printing ink composition comprising the aqueous based pigment dispersion of claim 1.

38. A method for preparing an aqueous based pigment dispersion comprising dispersing a pigmentinto a dispersant dye as identified in the International Colour Index, and water.

39. A method for preparing a printing ink composition comprising adding the aqueous based pigment dispersion of claim 1 to a conventional printing ink formulation.

* * * * *

UNITED STATES PATENT AND TRADEMARK OFFICE
CERTIFICATE OF CORRECTION

PATENT NO.     : 6,503,317 B1                                            Page 1 of 1
DATED          : January 7, 2003
INVENTOR(S)    : Ortalano et al.

It is certified that error appears in the above-identified patent and that said Letters Patent is hereby corrected as shown below:

Column 1,
Line 37, "dispersions, the" should read -- dispersion, the --.

Column 5,
Line 60, "as ionexchange" should read -- as ion-exchange --.

Column 7,
Line 59, "from Sun Chem,ical)" should read -- from Sun Chemical --.

Column 10,
Line 43, "Desk-jetTM 670C" should read -- Deskjet$^{TM}$ 670C --.

Column 13,
Line 23, "is a phthalocyariine" should read -- is a phthalocyanine --.

Column 16,
Line 8, "a pigmentinto a" should read -- a pigment into a --.

Signed and Sealed this

Twentieth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,503,317 B1
DATED : January 7, 2003
INVENTOR(S) : Darren Mark Ortalano and Christopher Joseph Vissing It is certified that error appears in the above-identified patent and that said Letters Patent is hereby corrected as shown below:

<u>Title page,</u>
Item [63], Related U.S. Application Data,
Insert -- Provisional Application No. 60/087,111, filed on May 28, 1998 --

Signed and Sealed this

Thirteenth Day of April, 2004

JON W. DUDAS
*Acting Director of the United States Patent and Trademark Office*